No. 814,565. PATENTED MAR. 6, 1906.
C. REICHERT & B. HEYNE.
PIVOTABLE MICROSCOPE STAND.
APPLICATION FILED JUNE 1, 1905.
2 SHEETS—SHEET 1.
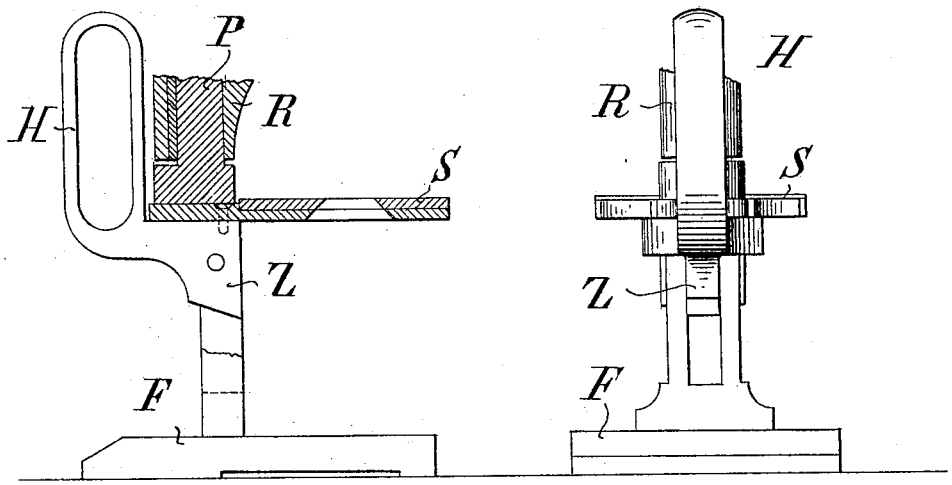

UNITED STATES PATENT OFFICE.

CARL REICHERT AND BERNHARD HEYNE, OF VIENNA, AUSTRIA-HUNGARY.

PIVOTABLE MICROSCOPE-STAND.

No. 814,565. Specification of Letters Patent. Patented March 6, 1906.

Application filed June 1, 1905. Serial No. 263,242.

*To all whom it may concern:*

Be it known that we, CARL REICHERT, a subject of the Emperor of Austria-Hungary, and BERNHARD HEYNE, a subject of the German Emperor, residing at Vienna, Austria-Hungary, have invented certain new and useful Improvements in Pivotable Microscope-Stands, of which the following is a specification.

This invention relates to improvements in the generally-employed microscope-stands which are so arranged as to permit a pivoting or tilting of the microscope. These improvements consist, essentially, in the arrangement of an ear-shaped handle which is rigidly connected with the stage of the instrument. The characteristic feature of this arrangement consists in that the handle can be adapted to any ordinary instrument provided with a focusing prismatic bar for the fine adjustment of the instrument without involving the necessity of making important modifications of the entire stand.

The said invention has for its purpose to permit the easy carrying of the microscope without involving any danger of injury for the most delicate parts of the microscope, such as the prism-guide and the micrometer-screw, and without impairing the capability of the instrument to be pivoted or tilted.

The invention is illustrated in the accompanying drawings, in which—

Figure 3:
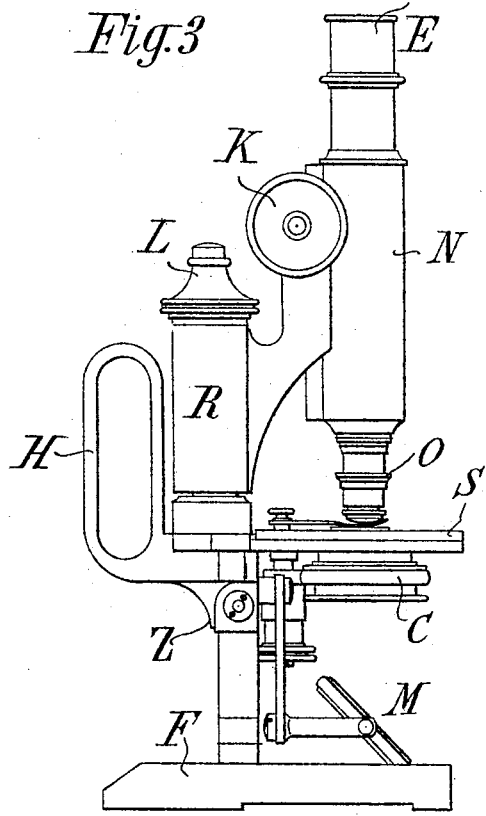
Figure 4:
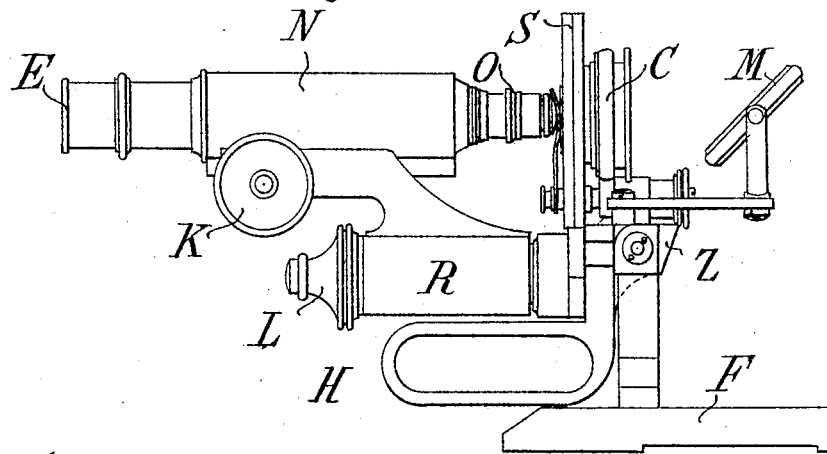

Figure 1 represents a section through those parts of the microscope to which the handle is connected. Fig. 2 shows an end elevation of these parts. Fig. 3 represents the entire instrument in its vertical position, and Fig. 4 shows the instrument in its tilted position.

The handle or ear H forms an extension or prolongation of the intermediate part Z, by means of which the stage S and the prism P are pivotally connected to the foot F of the microscope. In Figs. 3 and 4, M is the mirror; C, the condenser; O, the objective lens; E, the ocular lens; K, the screw for the coarse adjustment, and L the micrometer-screw for the fine adjustment. R is the column which supports the tube N and which contains in its interior the prismatic bar P with the guiding device of the same. In the instruments known until now the column R was itself used as a handle for carrying the microscope and for centering it, and the frequent use of this column for carrying and tilting the instrument was followed by the inconvenience that this important part of the apparatus was liable to be damaged and to wear out, so that the perfect centering of the entire microscope was frequently impaired thereby. The improved arrangement of the handle as shown in the drawings avoids the said inconvenience, the column R need not be touched by hand at all, and any pressure upon the sliding surfaces which guide the prism P is absolutely avoided. The entire function of the column in the improved arrangement of the microscope will therefore consist solely and exclusively in the fine adjustment of the tube, so that the adjusting device is very little subject to wear and tear.

It is clear from what has been said in the foregoing that owing to the said improved arrangement the average duration of an instrument provided with the same will be considerably increased.

We claim—

In a microscope, a foot having an upright, an intermediate member pivotally connected to said upright and adapted to support a prism and a stage, the said intermediate member having an extension integrally formed therewith and shaped to provide a handle, a column adjustably connected to the prism, the handle extension of the intermediate member being always parallel with the column, a shiftable tube supported by the said column and having lenses, and a mirror also carried by the intermediate member and simultaneously movable with the latter and the remaining parts of the microscope controlled by said intermediate member to always bring the said mirror into operative position with relation to the stage and the tube having lenses.

In testimony whereof we have hereunto set our hands in presence of two subscribing witnesses.

CARL REICHERT.
BERNHARD HEYNE.

Witnesses:
JOSEF RÜBORICH,
ALVESTO S. HOGUE.